United States Patent [19]

Scoggins et al.

[11] Patent Number: 4,588,789

[45] Date of Patent: May 13, 1986

[54] METHOD FOR THE CRYSTALLIZATION OF POLY(ARYLENE SULFIDE)

[75] Inventors: Lacey E. Scoggins; Guy Senatore, both of Bartlesville, Okla.

[73] Assignee: Phillips Petroleum Company, Bartlesville, Okla.

[21] Appl. No.: 699,694

[22] Filed: Feb. 8, 1985

Related U.S. Application Data

[63] Continuation of Ser. No. 559,136, Dec. 7, 1983, abandoned, which is a continuation-in-part of Ser. No. 416,209, Sep. 9, 1982, abandoned.

[51] Int. Cl.⁴ ............................................. C08F 283/00
[52] U.S. Cl. .................................... 525/537; 528/388; 264/331.11
[58] Field of Search ........................ 528/388; 525/537; 264/331.11

[56] References Cited

U.S. PATENT DOCUMENTS

| | | | |
|---|---|---|---|
| 4,017,450 | 4/1977 | Bailey | 260/37 R |
| 4,071,509 | 1/1978 | Edmonds, Jr. | 260/79 |
| 4,178,276 | 12/1979 | Shue et al. | 260/37 R |
| 4,237,039 | 12/1980 | Blackwell | 260/29.2 R |
| 4,373,091 | 2/1983 | Edmonds, Jr. | 528/481 |
| 4,405,745 | 9/1983 | Mathis et al. | 528/388 |
| 4,524,200 | 6/1985 | Sherk et al. | 528/388 |

*Primary Examiner*—Melvyn I. Marquis
*Attorney, Agent, or Firm*—A. W. Umphlett

[57] ABSTRACT

A method for affecting the crystallization of poly(phenylene sulfide), i.e., lowering the melt crystallization temperature or lowering the rate of crystallization of the polymer, in which phenylene sulfide polymer is contacted with polyvalent metal cations in solution, preferably aqueous at a temperature and for a time sufficient to affect the crystallization of the polymer.

24 Claims, No Drawings

METHOD FOR THE CRYSTALLIZATION OF POLY(ARYLENE SULFIDE)

This application is a continuation of Ser. No. 559,136, filed Dec. 7, 1983, now abandoned, and which is a continuation-in-part of Ser. No. 416,209, filed Sept. 9, 1982, now abandoned.

This invention relates to the production of arylene sulfide polymer. In one of its aspects, this invention relates to a method by which the crystallization of poly(arylene sulfide) which has been prepared using an additive that reduces the melt flow of the polymer, particularly polymer prepared with alkali metal carboxylate, is effected. In another of its aspects, this invention relates to a method for lowering the rate of crystallization of poly(arylene sulfide). In yet another of its aspects, this invention relates to the lowering of the melt crystallization temperature (Tmc) of poly(arylene sulfide). In still another aspect of the invention, it relates to end products having improved physical properties that are produced from poly(arylene sulfide) that is treated by the method of the present invention.

Generally in the preparation of poly(arylene sulfide), or more particularly poly(phenylene sulfide), particulate polymer, after separation from the reaction mixture, is subjected to a series of washing operations to remove residual sodium chloride by-product and other, particularly ash-producing, contaminants. We have observed that polymer passing through a series of wash operations is subject to an increase in the melt crystallization temperature (Tmc). Since the production of end products from poly(phenylene sulfide) often requires or is benefitted by lower Tmc values than would be obtained after succession of purified water washings, an investigation was initiated to determine the reason for the increase in Tmc. From this investigation, it was found that the removal of polyvalent metal ions by extraction from the polymer in the purified water washes was the cause of the increase in Tmc. It was then discovered that the process could be reversed to bring about a lowering of the Tmc and to provide poly(phenylene sulfide) with a decreased rate of crystallization. The polymers produced by this treatment were found, when used in film and fiber production, to provide greater processing time for increasing stretch orientation and draw, respectively, because of the slow melt crystallization rate. In the production of molded objects, the slow rate of crystallization was found to prevent internal cracking because more time for stress relaxation is available during cooling.

It is, therefore, an object of this invention to provide a method for affecting the crystallization of poly(arylene sulfide), more particularly poly(phenylene sulfide). It is still another object of this invention to provide polymer of arylene sulfide having a lower melt crystallization temperature (Tmc) and, therefore, a slower melt crystallization rate than the same polymer would have without being treated by the present process.

It is still another object of this invention to provide polymeric end products such as fibers, film, and molded objects which have physical characteristics improved over those characteristics which they would have without being treated by the process of the present invention.

Other objects, aspects, and the several advantages of the invention will be apparent to those skilled in the art upon a study of the specification and the appended claims.

THE INVENTION

According to the invention, a method is provided for affecting the crystallization of poly(arylene sulfide) in which the polymer is treated with mono- and polyvalent cations in solution, preferably aqueous, at a temperature and for a time sufficient to affect the crystallization of the polymer. The manner in which the crystallization is affected can be described as a decrease in the rate of crystallization or as a lowering of the melt crystallization temperature (Tmc).

In further embodiments of the invention, the crystallization of phenylene sulfide particulate polymer is affected by heating the polymer slurry in an aqueous medium in the presence of at least one water soluble chemical compound selected from metal salts, oxides and hydroxides of Groups IA and IIA of the Periodic Table under conditions of temperature and for a period of time sufficient to reduce the melt crystallization temperature and the rate of crystallization of the polymer. The treatment is normally carried out with purified, particulate resins to expedite contact with the treating agent, but can also be accomplished using resin as it is formed in the reactor. The treating step can be carried out with dry resins after it has been purified substantially to remove the contaminants, such as metal halides, organic solvent, metal sulfide, and other impurities which can be present in the crude reaction product or with crude, wet resin.

Arylene sulfide polymers, particularly poly(phenylene sulfide), that can be employed in the process of this invention include those polymers, generally, which have been prepared by use of a p-dihalobenzene, an alkali metal sulfide, an organic amide, and an additive that reduces the melt flow of the polymer produced as compared with the polymers produced without the use of the additive, such as is particularly illustrated by the use of an alkali metal carboxylate as in U.S. Pat. No. 3,919,177. Optionally, the polymer can be produced with the above components together with an alkali metal hydroxide, such as sodium hydroxide, e.g., in an amount up to about 0.8 mol of alkali metal hydroxide per mole of alkali metal sulfide and/or a polyhaloaromatic compound such as 1,2,4-trichlorobenzene, e.g., in an amount up to about 0.6 parts by weight per 100 parts by weight p-dihalobenzene. Lithium halides are alternative additives which can be used to produce polymer of reduced melt flow. If desired, water which can be present with the reactants can be removed by distillation prior to the polymerization reaction. The polymers produced will generally have a melt flow within the range of about 5 to about 300, preferably about 40 to about 150.

The particulate resin useful in this invention which is typified by poly(phenylene sulfide) as made according to U.S. Pat. No. 3,919,177 can be recovered from the reaction process as a free flowing white powder having a particle size range averaging from about 5 to about 1500 micrometers, generally ranging from about 10 to about 150 micrometers or it can be recovered by merely processing a coarse particulate polymer. Although the process of this invention is applicable to polymers of various particle sizes, the process is more easily carried out with more finely divided particles.

It is to be understood that the processes of this invention can be carried out in a number of ways. In one manner of operation, the reaction mass comprising particulate polymer, alkali metal halide, an organic amides can be subjected to suitable separation techniques to recover polymer substantially free of organic amide, unreacted reactants, and alkali metal halides. For example, the polymer can be recovered from the reaction slurry and then combined with water to extract ash-forming materials. As has been alluded to above, the amount of impurities removed by water extraction methods certainly affects the degree to which the present invention treatment will be required. The invention seeks to produce a particulate polymer having a residual mono- or polyvalent metal cation content in the range of about 50 to about 5000 ppm, preferably about 100 to about 3000 ppm.

The treating agents suitable for this invention are water soluble and are selected from mono- and polyvalent metal salts, oxides and hydroxides derived from the alkali and alkaline earth metal elements of Periodic Groups IA and IIA since many of these are colorless, water soluble, and relatively inexpensive. Particularly useful are hydroxides of alkali and alkaline earth metals. At present, the preferred compound for use in this invention is (1) calcium oxide or its hydrated form, calcium hydroxide or (2) $CaCl_2$.

Although this invention is aimed principally at the use of aqueous solutions, in its broadest application any solvent in which the treating agents can be dissolved can be used.

In accordance with an embodiment of this invention, phenylene sulfide polymer is contacted in an aqueous slurry with at least one chemical treating agent as defined herein at an elevated temperature and for a period of time sufficient to affect the crystallization of the polymer. The effectiveness of the treatment can be assessed by noting the change in the melt crystallization temperature which should be lowered by the treatment. The determination of melt crystallization temperature is well known in the art.

The treating to affect the crystallization of the polymer should be carried out at ambient temperature or at an elevated temperature which is below the melting point of the polymer for a period of time sufficient to decrease the melt crystallization temperature of the polymer. Originally, the contacting was thought to require a temperature of at least about 300° F. not exceeding about 25° F. below the melting point of the polymer, so that, ordinarily, the contacting temperature would be in the range of about 350° F. to about 520° F. More recent experience has determined, however, that operation of the invention is easily accomplished at temperatures on the range of 130°–140° F. using wet resin (see example V and VI below) and that operation is feasible at ambient temperature. The further testing has caused the operating temperature range to be set broadly at ambient to a temperature not to exceed about 25° F. below the melting point of the polymer, preferably about 80° F. to about 520° F.

The time for treatment or contacting can vary greatly depending on the temperature and the nature of the arylene sulfide polymer. It generally will be within the range of about 5 minutes to about 24 hours, preferably about 30 minutes to about 10 hours. In general, it can be said that the contact time decreases with increasing temperature. The pressure should be sufficient to maintain liquid phase conditions which can range from about 0 to about 1500 psi. Repeated treatments can be employed, if desired, or the process can be carried out in several phases, if desired.

The polymer/water slurry can consist of about 10 to about 60 weight percent polymer and more preferably from about 20 to about 50 weight percent polymer to provide convenient handling and separation factors.

After normal purification and drying steps, the resin is left in the particulate size and form at which the process started. As stated above, utilization of finely divided resins will expedite contact with the water and treating agent.

The process of this invention can be conducted batchwise or continuously.

The heating and contacting of the chemical treating agent can be carried out in conventional equipment. A convenient method for carrying out the process is to contact the polymer slurry with a chemical treating agent in an enclosed tank provided with agitation. The contacting can be carried out in a single vessel or in a plurality of vessels. The polymer can be separated from the slurry after contacting by suitable techniques including pressure reduction, filtration, and the like. The polymer is subsequently dried for further use as desired. Such further uses as extrusion into sheets, extrusion into film, spinning into fiber, or molding into molded objects can be contemplated.

The following examples are intended to illustrate the compositions and process of the invention.

EXAMPLE I

In this example the preparation of a representative poly(phenylene sulfide) Ryton ®. A resin from a reaction mixture containing sodium sulfide, N-methyl-2-pyrrolidone (NMP), sodium acetate, water, p-dichlorobenzene (DCB), and 1,2,4-trichlorobenzene (TCB) is described.

23.5 lb of sodium acetate and 25.7 gallons of NMP were charged to a necessary Ryton ® pilot plant reactor, which was then purged three times with nitrogen. An aqueous sodium sulfide solution formed by mixing 72.6 lb of a 50.34 weight-% NaOH solution and 87.7 lb of a solution containing 58.99 weight-% NaHS and 0.21 weight-% $Na_2S$ was added to the reactor. Feed lines were flushed with 8.0 gallons of NMP, which was also charged to the reactor. The reactor content was then dehydrated for 90 minutes at 13 psig and a temperature ranging from 332° F. (initial) to about 450° F. (final).

Subsequently 132.9 lb of DCB were charged, and the polymerization reaction was carried out for about 2 hours 20 minutes at a temperature ranging from 447° F. (initial) to 510° F. (final) and a pressure ranging from 30 psig (initial) to 135 psig (final). After one hour at about 508° F., 90 ml of TCB and 2.0 gallons of NMP were added, and the polymerization was continued for 2 more hours at a temperature of about 509° F. and a pressure of about 145 psig.

Ten gallons of deionized water were charged to the reactor after cooling to about 250° F. Thereafter, the reactor mixture was cooled to about 213° F., under a nitrogen pressure of about 100 psig, and was transferred to a dilution tank containing 50 gallons of deionized water. After filtration, the polymer filter cake was washed once with 120 gallons cold deionized water (70° F.) and twice with 80 gallons of hot deionized water (350° F.) and filtered after each wash.

EXAMPLE II

Eight wet poly(phenylene sulfide) batches prepared and washed in accordance with the procedure described in Example I were treated as follows. Half of each of the wet resin batches was dried at about 200°-300° F. under atmospheric pressure conditions for about 3 hours and used as control runs. The other half of each batch was treated for about 1 hour with aqueous solutions containing ionic metal compounds in a stirred vessel at 350° F. Pertinent data of untreated control resins (designated A) and treated inventive resins (designated B) are listed in Table I.

TABLE I

| Run | Treating Agent | Concentration[a] (as ppm CaO in $H_2O$) | Tmc[b] | Flow Rate[c] (g/10 min.) After (°C.) 5 minutes | After 30 minutes | Ash Weight % | Insolubles[d] (ppm) |
|---|---|---|---|---|---|---|---|
| 1A | None | 0 | 225 | 98 | 367 | 0.11 | 53 |
| 1B | Calcium Oxide | 530 | 160 | 42 | 122 | 0.29 | 37 |
| 2A | None | 0 | 198 | 45 | 123 | 0.13 | 20 |
| 2B | Calcium Oxide | 265 | 183 | 25 | 97 | 0.34 | 30 |
| 3A | None | 0 | 224 | 70 | 160 | 0.09 | 33 |
| 3B | Tap Water | 225 | 217/191 | 55 | 152 | 0.10 | 29 |
| 4A | None | 0 | 227 | 180 | 312 | 0.03 | — |
| 4B | Calcium acetate | 530 | 210 | 141 | 267 | 0.14 | — |
| 5A | None | 0 | 210 | 137 | 246 | 0.06 | — |
| 5B | Calcium Chloride | 530 | 204 | 139 | 310 | 0.09 | — |
| 6A | None | 0 | 222 | 93 | 187 | 0.06 | — |
| 6B | Magnesium hydroxide | 530 | 173 | 74 | 137 | 0.68 | — |
| 7A | None | 0 | 197 | 77 | 127 | 0.18 | — |
| 7B | Sodium hydroxide | 530 | 179 | 59 | 109 | 0.24 | — |
| 8A | None | 0 | — | — | — | — | — |
| 8B | Barium Hydroxide | 229 | 180 | 48 | 88 | 0.31 | — |

Footnotes to Table I

[a] $\frac{\text{ppm of dissolved compound}}{\text{formula weight of dissolved compound}} \times 56.1$

[b] determined with a Perkin Elmer DSC-2C differential scanning calorimeter with attached 3500 Data Station; cooling of the polymer melt started at 360° C.; rate of cooling was 20° C./minute

[c] determined at 316° C. according to a modified ASTM D1238 method employing an orifice of 0.0825" diameter and a 0.315" length and an effective weight of 5.0 Kg (including the weight of the piston)

[d] determined by weighing the dried residue of the dissolution of PPS in 1-chloronaphthalene at 235-245° C.; 4 samples of 40 grams each are placed in a 325 mesh screen basket and immersed in 1.0 liter of 1-chloronaphthalene.

Data in Table I show that treatment of wet PPS resin with aqueous solutions of ionic compounds, preferably alkali metal and alkaline earth metal hydroxides (Runs 1B, 2B, 6B, 7B, 8B) results in a substantial lowering of the melt crystallization temperature, Tmc, to about 160°-180° C. Metal chlorides do not appear to be particularly effective at the conditions of Run 5B. Ash levels increased, yet generally stayed at acceptable levels of about 0.2-0.7 weight-%. The flow rate of treated PPS generally decreased, which indicates some crosslinking action of metal ions, particularly divalent ions ($Ca^{2+}$, $Mg^{2+}$, $Ba^{2+}$). The characteristic flow rate increase by a factor of about 2-3 of uncured, branched PPS after heat-soaking for about 30 minutes vs. flow rate after heating for only 5 minutes was hardly affected by the treatment with dissolved ionic compounds.

EXAMPLE III

Eight samples of Ryton ® A PPS treated with solutions of 526 ppm of calcium oxide in water essentially in accordance with the procedure of Example II and having a melt crystallization temperature, Tmc (see footnote to table I), of 175°-193° C., were extruded into films after having been pelletized on a 1" NRM extruder at a die temperature of about 610° F. and dried overnight in a Blue M oven at 210°-230° F.

The extrusion was carried out on a 1" NRM extruder without screens through a 0.010"×3" slot die having a temperature of 610° F. The extruded film was passed over a pair of heated rolls having a temperature of 175° F. and was then taken up.

Tmc values of extruded films measured in accordance with the procedure described in Example II ranged from about 186° C. to 204° C. The appearance of all eight films was rated "5" based on the following scale: "1" (covered with bubbles), "2" (many bubbles), "3" (bubbles easily noticed), "4" (very few small bubbles), "5" (no bubbles).

EXAMPLE IV

PPS washed with aqueous solutions containing 424 ppm of CaO, essentially in accordance with the procedure of Example II were spun into fibers. The lime-washed resin, which had a flow rate of 143 g/10 minutes and a Tmc (starting from 360° C.; see footnote to Table I) of 193° C., was vacuum-dried overnight at 110°-120° C. The water-cooled polymer feed was extruded in a 1" Wayne Machine and Die Co. extruder through 60/100/200/Dynalloy XIIL/60 mesh pack screens and a spinneret having 34 holes of 0.048" length and 0.012" diameter. The block temperature was about 300° C., and the polymer extrusion rate was about 13.9 grams per minute.

The extruded strand of 34 yellow PPS filaments was drawn over a hot plate at 100° C. to a draw ratio of 4.0. Pertinent physical of the drawn year were; denier: 229; tenacity: 3.7 grams per denier; elongation: 19%; initial modulus: 47 grams per denier. Tenacity, modulus and elongation were determined on an Instron 1122 tensile tester; the yarn was stretched at a rate of about 200 mm/minute.

EXAMPLE V

This example illustrates the treatment of PPS with aqueous solutions of calcium compound at a relatively low temperature. 23.5 lb of sodium acetate and 15.7 gallons of NMP were charged to a Ryton ® pilot plant reactor, which was purged three times with nitrogen. Then a mixture of 72.7 lb of an aqueous 50.70 weight-% solution of NaOH and of 89.2 lb of an aqueous solution containing 58.17 weight-% NaSH and 0.35 weight-%

Na₂S was added to the reactor. Feed lines were flushed with a total amount of 18.0 gallons of NMP, which was also charged to the reactor. The reactor content was dehydrated for about 90 minutes at a pressure of about 17 psig and a temperature ranging from 333° F. (initial) to 433° F. (final).

Subsequently 136.4 lb of DCB were charged, and the polymerization was carried out at about 437°–450° C. and a pressure of 29–70 psig for about 2 hours, and then at about 510° F. and 150–164 psig for about 1 hour (after a 20 minute heat-up period to raise the temperature from 450° F. to 510° F.). Finally 105 milliliters of TCB and 2 gallons of NMP were charged, and the polymerization was continued at 510° F./162 psig.

Ten gallons of deionized water were added to the reactor, which had been cooled to 275° F., so as to accomplish separation into a PPS phase and a NMP phase. The reactor content (at 225° F.) was then transferred by means of pressurized nitrogen into a dilution tank containing 50 gallons of deionized water (at about 80° F.) and 255 grams of hydrated lime, $Ca(OH)_2$. The temperature of the mixture was about 140° F.

After about 2 hours, the cooled PPS slurry was filtered through metal screens, and the PPS filter cake was washed once with about 120 gallons of cold city water and twice with about 80 gallons of hot city water (350° F.). The polymer was then dried for 2 hours in air at about 350° F.

The Ca-treated PPS had a Tmc of 169° C. (for determination see footnote to Table I), a Na⁺ content of 222 ppm, a $Ca^{2+}$ content of 327 ppm, and a total ash level of 0.27 weight-%.

These results show that a Tmc as low as those listed in Table I can be attained by treatment with a Ca compound at a temperature considerably lower than 350° F. as employed in runs 1B–8B of Example II.

EXAMPLE VI

This example illustrates the treatment of PPS with aqueous $CaCl_2$. One polymer was prepared essentially in accordance with the procedure described in Example V, except that (a) 222 grams of $CaCl_2$ dissolved in 1 gallon of water plus 9 gallons of city water were added to the reactor at about 275° F., after the polymerization had been completed, and (b) no lime was added to the dilution tank. The washed and dried PPS resin had a Tmc of 174° C. and an ash level of 0.49%.

A second run was carried out essentially in accordance with the procedure described in Example V, except that 222 grams of $CaCl_2$ (in lieu of 255 grams of $Ca(OH)_2$) were added to the dilution tank (temperature of the mixture: about 136° F.). This washed and dried polymer had a Tmc of 170° C. and an ash level of 0.48 weight-%. These results confirm those reported in Example V.

The test results also show that $CaCl_2$ is considerably more effective in reducing the Tmc of wet, unwashed PPS (treated at 136° F. to 275° F.) than in reducing the Tmc of washed, dried PPS (treated at 350° F., see run 5B of Table I).

We claim:

1. A method for affecting the crystallization of poly(phenylene sulfide) comprising contacting poly(phenylene sulfide) with water soluble, mono- or polyvalent metal inorganic salt or hydroxide of alkali and alkaline earth metal elements of Group IA and IIA of the Periodic Table in solution at a temperature and for a time to provide metal cations in a residual concentration in the range of about 50 to about 5000 ppm in the composition with the polymer after the treatment thereby affecting the crystallization of the polymer by lowering the rate of crystallization and/or lowering the melt crystallization temperature.

2. A method of claim 1 wherein the treating is carried out in aqueous solution.

3. A method of claim 2 wherein the rate of crystallization of poly(phenylene sulfide) is lowered.

4. A method of claim 2 wherein the melt crystallization temperature (Tmc) is lowered.

5. A method of claim 2 wherein wherein the temperature is in a range of ambient to about 25° F. below the melting point of the polymer.

6. A method of claim 3 wherein the temperature is in a range of ambient to about 25° F. below the melting point of the polymer.

7. A method of claim 4 wherein the temperature is in a range of ambient to about 25° F. below the melting point of the polymer.

8. A method of claim 5 wherein the temperature is in a range of about 80° F. to about 520° F.

9. A method of claim 6 wherein the temperature is in a range of about 80° F. to about 520° F.

10. A method of claim 7 wherein the temperature is in a range of about 80° F. to about 520° F.

11. A method of claim 5 wherein the metal cation is supplied by an aqueous solution of calcium oxide.

12. A method of claim 6 wherein the metal cation is supplied by an aqueous solution of calcium oxide.

13. A method of claim 7 wherein the metal cation is supplied by an aqueous solution of calcium oxide.

14. A method of claim 5 wherein the metal cation is supplied by an aqueous solution of $CaCl_2$.

15. A method of claim 6 wherein the metal cation is supplied by an aqueous solution of $CaCl_2$.

16. A method of claim 7 wherein the metal cation is supplied by an aqueous solution of $CaCl_2$.

17. Poly(phenylene sulfide) treated by the method of claim 1.

18. Poly(phenylene sulfide) treated by the method of claim 2.

19. Poly(phenylene sulfide) treated by the method of claim 3.

20. Poly(phenylene sulfide) treated by the method of claim 4.

21. Poly(phenylene sulfide) of claim 17 further processed into sheet, film, fiber, extruded objects or molded objects.

22. Poly(phenylene sulfide) of claim 18 further processed into sheet, film, fiber, extruded objects or molded objects.

23. Poly(phenylene sulfide) of claim 19 further processed into sheet, film, fiber, extruded objects or molded objects.

24. Poly(phenylene sulfide) of claim 20 further processed into sheet, film, fiber, extruded objects or molded objects.

* * * * *